US006998792B2

(12) United States Patent
Takahashi et al.

(10) Patent No.: US 6,998,792 B2
(45) Date of Patent: Feb. 14, 2006

(54) ELECTRODELESS DISCHARGE LAMP LIGHTING DEVICE, LIGHT BULB TYPE ELECTRODELESS FLUORESCENT LAMP AND DISCHARGE LAMP LIGHTING DEVICE

(75) Inventors: Kenichiro Takahashi, Osaka (JP); Satoshi Kominami, Osaka (JP); Kouji Miyazaki, Osaka (JP); Toshiaki Kurachi, Osaka (JP); Yoko Matsubayashi, Nara (JP); Mamoru Takeda, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 51 days.

(21) Appl. No.: 10/495,374

(22) PCT Filed: Jun. 6, 2003

(86) PCT No.: PCT/JP03/07235

§ 371 (c)(1),
(2), (4) Date: May 12, 2004

(87) PCT Pub. No.: WO03/105542

PCT Pub. Date: Dec. 18, 2003

(65) Prior Publication Data

US 2005/0017656 A1 Jan. 27, 2005

(30) Foreign Application Priority Data

Jun. 7, 2002 (JP) ............................ 2002-167613

(51) Int. Cl.
*H05B 41/16* (2006.01)
*H05B 41/24* (2006.01)

(52) U.S. Cl. ................ 315/248; 315/291; 315/DIG. 4; 315/307

(58) Field of Classification Search ............... 315/224, 315/225, 244, 248, 291, 307, 308, 360, DIG. 4, 315/DIG. 5, DIG. 7
See application file for complete search history.

(56) References Cited

U.S. PATENT DOCUMENTS 5,243,261 A * 9/1993 Bergervoet et al. ......... 315/248

(Continued)

FOREIGN PATENT DOCUMENTS

EP 827184 A2 3/1998

(Continued)

OTHER PUBLICATIONS

International Search Report for PCT/JP03/07235, mailed Sep. 2, 2003; ISA/JPO.

*Primary Examiner*—Thuy V. Tran
*Assistant Examiner*—Marie Antoinette Cabucos
(74) *Attorney, Agent, or Firm*—Harness, Dickey & Pierce, P.L.C.

(57) ABSTRACT

An electrodeless discharge lamp operating device including an electrodeless discharge lamp 3 and a ballast circuit 4, wherein the ballast circuit 4 includes: an AC-DC converter 5 for converting a phase-controlled AC voltage into a DC voltage; a DC-AC converter 6 formed so as to intermittently drive the electrodeless discharge lamp 3 due to the existence of an operating period during which a high-frequency voltage is applied to the electrodeless discharge lamp 3 so that the electrodeless discharge lamp 3 is operated, and an extinguishing period during which the generation of the high-frequency voltage is stopped so that the electrodeless discharge lamp 3 is extinguished; and a dimming controller 7 for detecting the turn-on of the phase-controlled AC voltage, for outputting an intermittent command signal that changes the ratio between the operating period and the extinguishing period to the DC-AC converter 6, and for outputting a signal that maintains an intermittent dimmable operating state even if dimming state is in full illumination.

14 Claims, 10 Drawing Sheets

U.S. PATENT DOCUMENTS

| | | | |
|---|---|---|---|
| 5,561,351 A * | 10/1996 | Vrionis et al. | 315/248 |
| 5,604,411 A * | 2/1997 | Venkitasubrahmanian et al. | 315/307 |
| 5,994,848 A * | 11/1999 | Janczak | 315/224 |
| 6,072,282 A * | 6/2000 | Adamson | 315/276 |
| 6,486,616 B1 * | 11/2002 | Liu et al. | 315/291 |
| 6,504,322 B1 * | 1/2003 | Takahashi et al. | 315/307 |
| 6,545,431 B1 * | 4/2003 | Hui et al. | 315/291 |
| 6,674,248 B1 * | 1/2004 | Newman et al. | 315/247 |
| 6,784,622 B1 * | 8/2004 | Newman et al. | 315/219 |
| 2001/0030514 A1 | 10/2001 | Takahashi et al. | 315/219 |

FOREIGN PATENT DOCUMENTS

| | | |
|---|---|---|
| EP | 1168893 A1 | 1/2002 |
| JP | 3-233894 A | 10/1991 |
| JP | 4-138699 A | 5/1992 |
| JP | 7-57886 A | 3/1995 |
| JP | 11-111486 A | 4/1999 |
| JP | 2000340382 A | 12/2000 |
| JP | 2001185393 A | 7/2001 |
| JP | 2002100495 A | 4/2002 |

* cited by examiner

ELECTRODELESS DISCHARGE LAMP LIGHTING DEVICE, LIGHT BULB TYPE ELECTRODELESS FLUORESCENT LAMP AND DISCHARGE LAMP LIGHTING DEVICE

CROSS-REFERENCE TO RELATED APPLICATIONS

This application is a National Stage of International Application No. PCT/JP03/07235, filed Jun. 6, 2003. This application claims the benefit of 2002-167613, filed Jun. 7, 2002. The disclosure of the above applications are incorporated herein by reference.

TECHNICAL FIELD

The present invention relates to discharge lamp operating devices and electrodeless discharge lamp operating devices. In particular, the present invention relates to electrodeless self-ballasted fluorescent lamps in which electrodeless fluorescent lamps can be dimmed.

BACKGROUND ART

A fluorescent lamp has been widely used from global environmental protection and economic standpoints because it has a higher degree of efficiency and a longer life as compared with an incandescent lamp. In recent years, as an economical light source, an electrodeless self-ballasted fluorescent lamp having no electrode has been attracting much attention since its life is several times longer than that of a conventional self-ballasted fluorescent lamp having electrodes, and the demand for an electrodeless self-ballasted fluorescent lamp is on the increase.

Furthermore, a self-ballasted fluorescent lamp in which a fluorescent lamp and a ballast circuit therefor are integrally formed is becoming a focus of attention as an energy-saving light source in houses, hotels, restaurants or the like, and is now becoming widespread because the self-ballasted fluorescent lamp can be readily used as it is in place of an incandescent lamp. In addition to the self-ballasted fluorescent lamp of this type having electrodes, the self-ballasted fluorescent lamp of this type having no electrode is also under development.

With the widespread use of the self-ballasted fluorescent lamp, as with a dimmable incandescent lamp, the need for dimming of the self-ballasted fluorescent lamp is being created. To be more specific, in houses or hotels, people carry out various daily living activities such as reading or spending a happy time with family, and in order to achieve a comfortable light environment adapted to these daily living activities, a user desires brightness suitable to each situation and seeks a function that realizes such brightness. Since an incandescent lamp does not emit light by discharge, it can be easily dimmed by merely adjusting electric power supplied thereto. On the other hand, since a fluorescent lamp emits light by discharge, it is difficult to implement a dimmable fluorescent lamp that can be practically used by merely adjusting electric power supplied thereto like an incandescent lamp.

Lately, in response to a need for a user to change brightness utilizing an already-known incandescent lamp dimmer as with an incandescent lamp, a self-ballasted fluorescent lamp with electrodes, which is connected to an incandescent lamp dimmer and allows dimmable operation, has been developed (see Japanese Unexamined Patent Publication No. 1999-111486, for example). However, the fact is that an electrodeless self-ballasted fluorescent lamp which is dimmable has not yet been developed.

The present applicant has already developed an electrodeless self-ballasted fluorescent lamp that is dimmable, and succeeded in completing such a lamp; however, this lamp still has inadequacies. For example, if dimming is carried out from full illumination state so that luminous flux is reduced, discontinuous luminous flux change occurs, thus making a user feel uncomfortable. Even if a dimmable incandescent lamp is dimmed in such a manner, luminous flux change thereof is continuous; therefore, a user who has been using a dimmable incandescent lamp particularly feels very uncomfortable in utilizing a dimmable electrodeless self-ballasted fluorescent lamp.

The present invention has been made in view of the above-described problems, and its main object is to provide an electrodeless self-ballasted fluorescent lamp, an electrodeless discharge lamp operating device and a discharge lamp operating device which suppress the occurrence of discontinuous luminous flux change.

DISCLOSURE OF THE INVENTION

A first inventive electrodeless discharge lamp operating device includes: an electrodeless discharge lamp; and a ballast circuit for applying a high-frequency voltage to the electrodeless discharge lamp, wherein the ballast circuit includes: an AC-DC converter for converting a phase-controlled AC voltage into a DC voltage; a DC-AC converter for converting the DC voltage into a high-frequency voltage, the DC-AC converter being formed so as to intermittently drive the electrodeless discharge lamp due to the existence of an operating period during which the high-frequency voltage is applied to the electrodeless discharge lamp so that the electrodeless discharge lamp is operated, and an extinguishing period during which the generation of the high-frequency voltage is stopped so that the electrodeless discharge lamp is extinguished; and a dimming controller for detecting the turn-on of the phase-controlled AC voltage, for outputting an intermittent command signal that changes the ratio between the operating period and the extinguishing period to the DC-AC converter, and for outputting a signal that maintains an intermittent dimmable operating state even if dimming is in full illumination state.

A second inventive electrodeless discharge lamp operating device includes: an electrodeless discharge lamp; and a ballast circuit for applying a high-frequency voltage to the electrodeless discharge lamp, wherein the ballast circuit includes: an AC-DC converter for converting a phase-controlled AC voltage into a DC voltage; a DC-AC converter for converting the DC voltage into a high-frequency voltage; and a dimming controller for outputting an intermittent driving signal to the DC-AC converter, wherein the dimming controller includes: a circuit for generating a sawtooth wave or a triangular wave synchronized with the turn-on of the phase-controlled AC voltage; and a dimming command signal generator for generating a dimming command signal, and wherein the dimming controller is formed so as to prevent the dimming command signal from exceeding a limiter value set lower than the maximum value of the voltage variation range of the sawtooth wave or triangular wave.

In one preferred embodiment, the dimming controller has a voltage limiter, which is connected to the dimming command signal generator, for preventing the dimming command signal from exceeding the limiter value.

The dimming controller is preferably further formed so as to output a signal for synchronizing the timing of the turn-on with that of the operation of the lamp intermittently driven by the DC-AC converter.

A third inventive electrodeless discharge lamp operating device includes: an electrodeless discharge lamp; and a ballast circuit for applying a high-frequency voltage to the electrodeless discharge lamp, wherein the ballast circuit includes: an AC-DC converter for converting a phase-controlled AC voltage into a DC voltage; a DC-AC converter for converting the DC voltage into a high-frequency voltage and for intermittently driving the electrodeless discharge lamp; and a dimming controller for detecting the turn-on of the phase-controlled AC voltage and for outputting an intermittent command signal that changes the ratio between an operating period and an extinguishing period to the DC-AC converter, and wherein the dimming controller includes: a circuit for generating a sawtooth wave or a triangular wave responsive to the turn-on phase of the waveform of the phase-controlled voltage; a dimming command signal generator for generating a dimming command signal responsive to the turn-on phase of the waveform of the phase-controlled voltage; a comparator for comparing the voltage of the sawtooth wave or triangular wave with that of the dimming command signal and for outputting the intermittent command signal; and a voltage limiter provided between the comparator and the dimming command signal generator.

In one preferred embodiment, the dimming controller does not output a signal for placing the electrodeless discharge lamp into a continuous operating state even if dimming state reaches full illumination, and outputs a signal for placing the electrodeless discharge lamp into an intermittent dimmable operating state even if dimming state is in full illumination.

In one preferred embodiment, the dimming controller has a sawtooth wave generator including a differentiating circuit that includes a capacitor and a resistor, wherein the differentiating circuit is connected to a collector terminal of a transistor for generating a pulse wave synchronized with the turn-on and turn-off of the phase-controlled AC voltage, wherein an output terminal of the differentiating circuit is connected with an anode of a diode while a cathode of the diode is connected with a base terminal of a transistor for discharge, and wherein a capacitor for charge and discharge is connected between a collector terminal and an emitter terminal of the transistor for discharge, thus allowing the generation of a sawtooth wave synchronized with the turn-on of the phase-controlled AC voltage.

In one preferred embodiment, the phase-controlled AC voltage is an output voltage of a dimmer which has been phase-controlled by the dimmer.

An inventive electrodeless self-ballasted fluorescent lamp includes: an electrodeless fluorescent lamp; a ballast circuit for applying a high-frequency voltage to the electrodeless fluorescent lamp; and a lamp base electrically connected to the ballast circuit, wherein the electrodeless fluorescent lamp, the ballast circuit and the lamp base are formed as one unit, wherein the ballast circuit includes: an AC-DC converter for converting a phase-controlled AC voltage into a DC voltage; a DC-AC converter for converting the DC voltage into a high-frequency voltage, the DC-AC converter being formed so as to intermittently drive the electrodeless fluorescent lamp due to the existence of an operating period during which the high-frequency voltage is applied to the electrodeless fluorescent lamp so that the electrodeless fluorescent lamp is operated, and an extinguishing period during which the generation of the high-frequency voltage is stopped so that the electrodeless fluorescent lamp is extinguished; and a dimming controller for detecting the turn-on of the phase-controlled AC voltage, for outputting an intermittent command signal that changes the ratio between the operating period and the extinguishing period to the DC-AC converter, and for outputting a signal that maintains an intermittent dimmable operating state even if dimming is in full illumination state.

An inventive discharge lamp operating device includes: a discharge lamp; an AC-DC converter for converting a phase-controlled AC voltage into a DC voltage; a DC-AC converter for converting the DC voltage into a high-frequency voltage, the DC-AC converter intermittently driving the discharge lamp due to the existence of an operating period during which the high-frequency voltage is applied to the discharge lamp so that the discharge lamp is operated, and an extinguishing period during which the generation of the high-frequency voltage is stopped so that the discharge lamp is extinguished; and a dimming controller for detecting the turn-on of the phase-controlled AC voltage, for outputting an intermittent command signal that changes the ratio between the operating period and the extinguishing period to the DC-AC converter, and for outputting a signal that maintains an intermittent dimmable operating state even if dimming is in full illumination state The dimming controller is preferably further formed so as to output a signal for synchronizing the timing of the turn-on with that of the operation of the lamp intermittently driven by the DC-AC converter.

In one preferred embodiment, the discharge lamp has a discharge bulb having a recessed portion, and an induction coil is inserted into the recessed portion of the discharge bulb.

BEST MODE FOR CARRYING-OUT OF THE INVENTION

Figure 1:
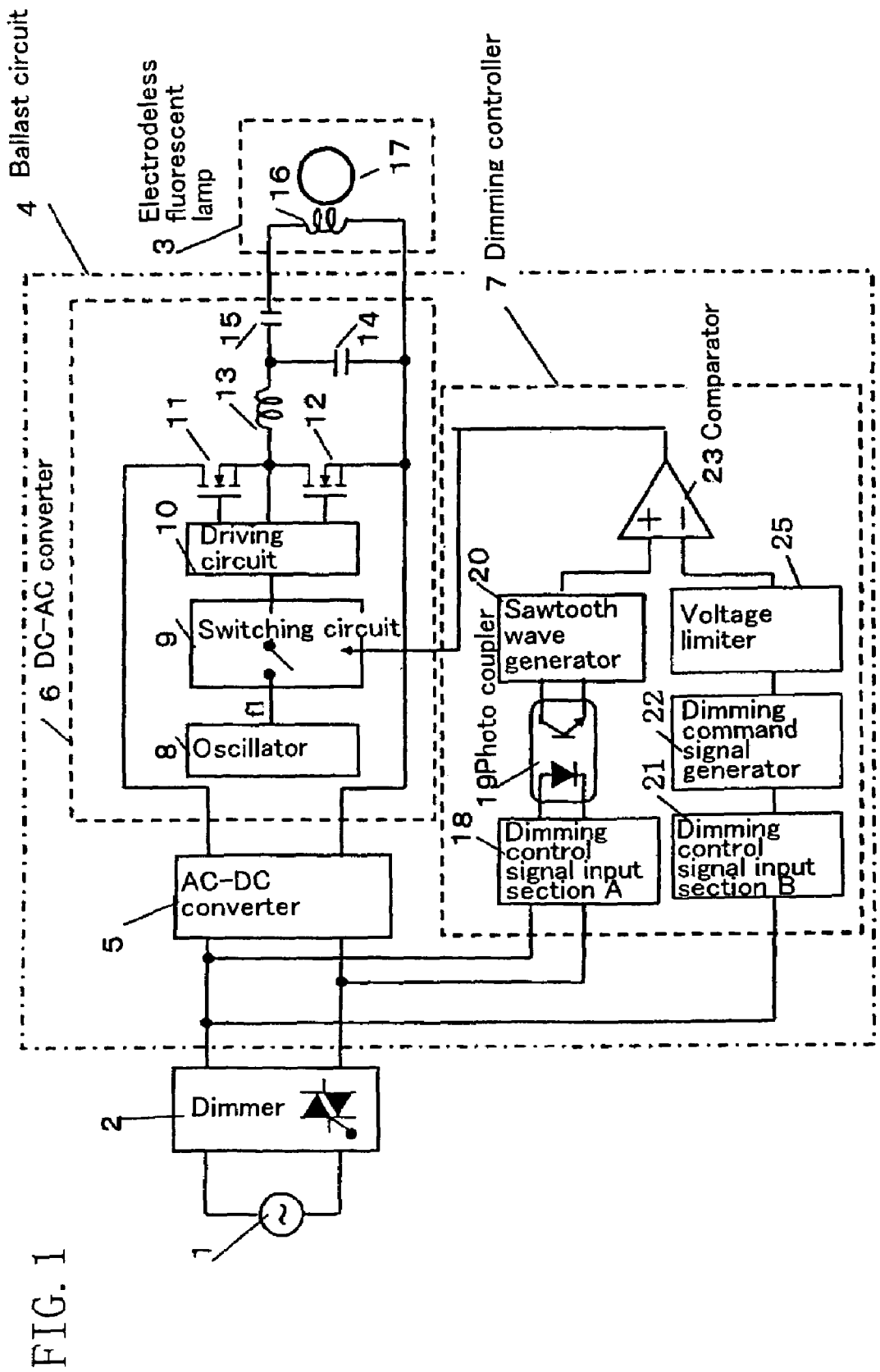
FIG. 1 is a diagram showing the circuit configuration of an electrodeless discharge lamp operating device (electrodeless self-ballasted fluorescent lamp) according to a first embodiment of the present invention.

Hereinafter, embodiments of the present invention will be described with reference to the drawings. In the following drawings, for simplification of the description, the same constituting elements having substantially identical functions are identified by the same reference characters. It should be noted that the present invention is not limited to the following embodiments.

(Embodiment 1)

FIG. 1 schematically shows the configuration of a discharge lamp operating device (electrodeless discharge lamp operating device) according to a first embodiment of the present invention. And FIG. 2 is a cross-sectional view of the discharge lamp operating device of the present embodiment implemented as an electrodeless self-ballasted fluorescent lamp.

The electrodeless self-ballasted fluorescent lamp of the present embodiment includes: an electrodeless fluorescent lamp 3; a ballast circuit 4 (circuit board 54) for applying a high-frequency voltage to the electrodeless fluorescent lamp 3; and a lamp base 56 electrically connected to the ballast circuit 4 (circuit board 54). The circuit board 54 shown in FIG. 2 is formed with the ballast circuit 4 shown in FIG. 1. Specifically, the circuit board 54 is formed with wirings provided as shown in the ballast circuit 4, and is attached with respective circuit components.

Figure 2:
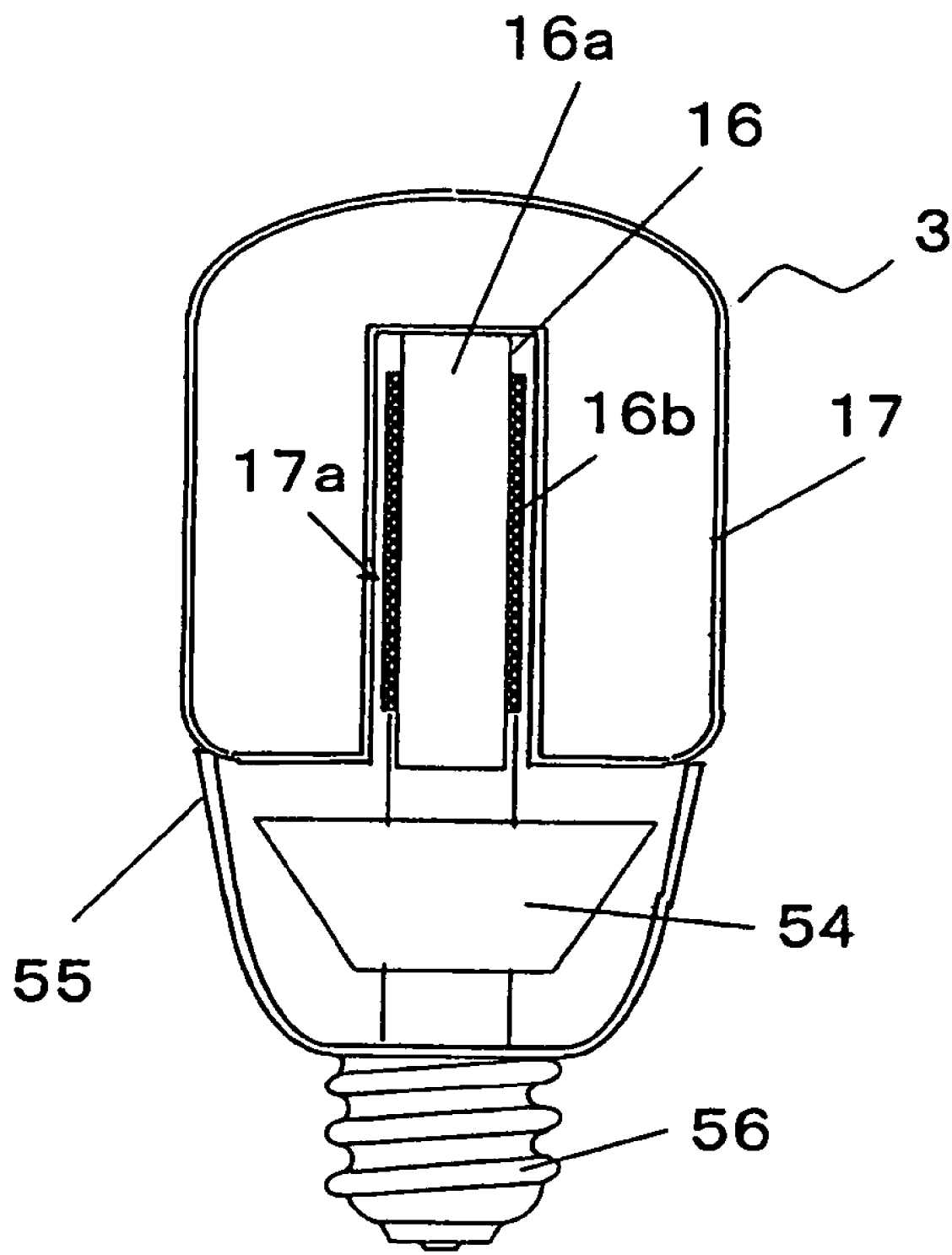
FIG. 2 is a cross-sectional view schematically showing the structure of the electrodeless self-ballasted fluorescent lamp of the first embodiment.

As shown in FIG. 2, in the electrodeless self-ballasted fluorescent lamp, the electrodeless fluorescent lamp 3, the ballast circuit 4 (circuit board 54) and the lamp base 56 are formed as one unit. In this embodiment, the electrodeless fluorescent lamp 3 includes a discharge bulb 17 having a recessed portion 17a, and an induction coil 16 made up of a core 16a and a coil 16b is inserted into the recessed portion 17a. The coil 16b is electrically connected to the circuit board 54, and a cover 55 for accommodating the circuit board 54 is provided around the circuit board 54. The lamp base 56 (e.g., E26 type for incandescent lamp) is attached to a lower part of the cover 55, and is electrically connected to the circuit board 54. By screwing the lamp base 56 into a socket for an incandescent lamp, the supply of electric power is allowed, and thus the operation of the electrodeless fluorescent lamp 3 is enabled. An AC voltage inputted through the lamp base 56 is an AC voltage that is phase-controlled by, for example, an external phase controller (such as a dimmer 2 shown in FIG. 1, typically a dimmer for an incandescent lamp).

The ballast circuit 4 shown in FIG. 1 includes: an AC-DC converter 5 for converting a phase-controlled AC voltage into a DC voltage; a DC-AC converter 6 for converting the DC voltage, which has been converted in the AC-DC converter 5, into a high-frequency voltage; and a dimming controller 7. It should be noted that the AC-DC converter 5, the DC-AC converter 6 and the dimming controller 7 may be called a converter for smoothing an AC voltage into a DC voltage, an inverter and a detector (detection means), respectively.

The ballast circuit 4 is connected to a commercial power supply 1 via the dimmer 2 for carrying out the phase control of a voltage supplied from the commercial power supply 1. Furthermore, the ballast circuit 4 operates the electrodeless fluorescent lamp 3 in response to the turn-on of the voltage phase-controlled in the dimmer 2. The commercial power supply 1 is an AC power supply for 60 Hz and 100V, for example, and the dimmer 2 is connected thereto. The dimmer 2 is one that carries out phase control using a triac, and a commercially available dimmer for an incandescent lamp can be typically used as the dimmer 2.

The AC-DC converter 5 converts the phase-controlled voltage, supplied from the dimmer 2, into a DC voltage. As the AC-DC converter 5, one that utilizes a diode bridge and a smoothing capacitor, for example, may be used. The DC-AC converter 6 is formed so as to intermittently drive the electrodeless fluorescent lamp 3 due to the existence of an operating period during which the converted high-frequency voltage is applied to the electrodeless fluorescent lamp 3 so that the electrodeless fluorescent lamp 3 is operated, and an extinguishing period during which the generation of the high-frequency voltage is stopped so that the electrodeless fluorescent lamp 3 is extinguished.

As shown in FIG. 1, the DC-AC converter 6 of the present embodiment includes: an oscillator 8; a switching circuit 9; a driving circuit 10; switching elements (MOSFETs 11 and 12); a resonant inductor 13; and resonant capacitors 14 and 15. Specifically, the induction coil 16 is connected to the resonant capacitor 15 in series, and furthermore, a series circuit of the induction coil 16 and the resonant capacitor 15 is connected to the resonant capacitor 14 in parallel. In this embodiment, the electrodeless fluorescent lamp 3 is formed by the induction coil 16 and the electrodeless discharge bulb 17. The induction coil 16 is made up of the ferrite core 17a and the coil 16b, and is placed into the recessed portion 16a of the discharge bulb 17.

The dimming controller 7 is formed so as to detect the turn-on of the phase-controlled AC voltage, and so as to output an intermittent command signal for changing the ratio between the operating period and extinguishing period to the DC-AC converter 6 (in particular, the switching circuit 9). Further, the dimming controller 7 is formed so as to output a signal for maintaining an intermittent dimmable operating state even if dimming is in full illumination state. In the present embodiment, in order to implement the dimming controller 7 formed in this way, the dimming controller 7 is provided with a voltage limiter 25. Furthermore, the dimming controller 7 of the present embodiment is formed so as to output a signal for synchronizing the timing of the turn-on with that of the operation of the electrodeless fluorescent lamp 3 intermittently driven by the DC-AC converter 6. In other words, the dimming controller 7 can be called a synchronous type duty modulator.

As shown in FIG. 1, the dimming controller 7 of the present embodiment includes: a dimming control signal input section A 18; a photo coupler 19; a sawtooth wave generator 20; a dimming command signal input section B 21; a dimming command signal generator 22; the voltage limiter 25; and a comparator 23 (e.g., a comparator formed using an operational amplifier). By using the photo coupler 19, the dimming control signal input section A 18 and the sawtooth wave generator 20 can be insulated from each other; therefore, noise reduction can be achieved, and performance increase can be attained. A sawtooth wave is generated using the dimming control signal input section A 18, to which the voltage phase-controlled by the dimmer 2 is inputted, the photo coupler 19 and the sawtooth wave generator 20. Alternatively, a triangular wave generator may be used instead of the sawtooth wave generator 20.

Furthermore, a dimming command signal is generated using the dimming command signal input section B 21 and the dimming command signal generator 22, and then, the sawtooth wave is sent to the non-inverting input terminal of the comparator 23 while the dimming command signal is sent to the inverting input terminal of the comparator 23; thus, from the resulting voltage difference, the comparator 23 generates an intermittent dimming signal. Between the comparator 23 and the dimming command signal generator 22, the voltage limiter 25 is provided, and the voltage limiter 25 prevents the dimming command signal, sent from the dimming command signal generator 22, from exceeding a limiter value set lower than the maximum value of the voltage variation range of the sawtooth wave. By adopting such a configuration, the dimming controller 7 of the present embodiment does not output a signal for placing the electrodeless discharge lamp 3 into a continuous operating state even if dimming state reaches full illumination, and can output a signal for placing the electrodeless discharge lamp 3 into the intermittent dimmable operating state even if dimming state is in full illumination.

Hereinafter, the operation of the electrodeless discharge lamp operating device according to the first embodiment will be described.

First, an output voltage from the commercial power supply 1 is phase-controlled in the dimmer 2, and then the phase-controlled AC voltage is converted into a DC voltage in the AC-DC converter 5.

Next, the driving circuit 10 for the MOSFETs 11 and 12 of the DC-AC converter 6 is driven in response to an output at a driving frequency f1 (Hz) from the oscillator 8. By allowing the two MOSFETs 11 and 12 to alternately turn on and off, the DC voltage smoothed by the AC-DC converter 5 is converted into a high-frequency voltage.

Subsequently, the high-frequency voltage is applied to a resonant circuit made up of the resonant inductor 13, the resonant capacitors 14 and 15, and the induction coil 16. Due to a current flowing through the induction coil 16, an AC electromagnetic field is generated within the electrodeless discharge bulb 17, and an energy supplied by the AC electromagnetic filed causes excitation of a light-emitting gas (not shown) enclosed within the electrodeless discharge bulb 17, resulting in light emission. As the light-emitting gas, for example, mercury, krypton, xenon or a gas mixture thereof may be used. Optionally, a gas containing only a rare gas but no mercury may also be used.

Note that, in that case, the timing of the turn-on of the phase-controlled voltage is detected by the dimming controller 7, and the turn-on of the intermittent command signal synchronized with the turn-on of the phase-controlled voltage occurs in the dimming controller 7 and is transmitted to the switching circuit 9. Over the period during which the intermittent command signal is transmitted to the switching circuit 9 (i.e., the on period, or the operating period of the electrodeless fluorescent lamp 3), the switching circuit is turned on, and the driving circuit 10 for the MOSFETs 11 and 12 is turned on. To the contrary, over the period during which the intermittent command signal is not transmitted to the switching circuit 9 (i.e., the off period, or the extinguishing period of the electrodeless fluorescent lamp 3), the switching circuit 9 is turned off, and the driving circuit 10 for the MOSFETs 11 and 12 is turned off. During the on period of the switching circuit 9, the turning on and turning off of the MOSFETs 11 and 12 are alternately repeated with the driving frequency f1 (Hz). In accordance with a variation in the conduction period of the voltage phase-controlled by the dimmer 2, the ratio between the on period and off period of the switching circuit 9, determined by the intermittent command signal from the dimming controller 7, is changed, and in accordance with this change, the ratio between the on period and off period of the MOSFETs 11 and 12 (which will be herein called a duty ratio) is varied. That is, the variation in the duty ratio causes a change in an electric energy input to the electrodeless fluorescent lamp 3, thus carrying out dimming of the electrodeless fluorescent lamp 3.

Figure 3:
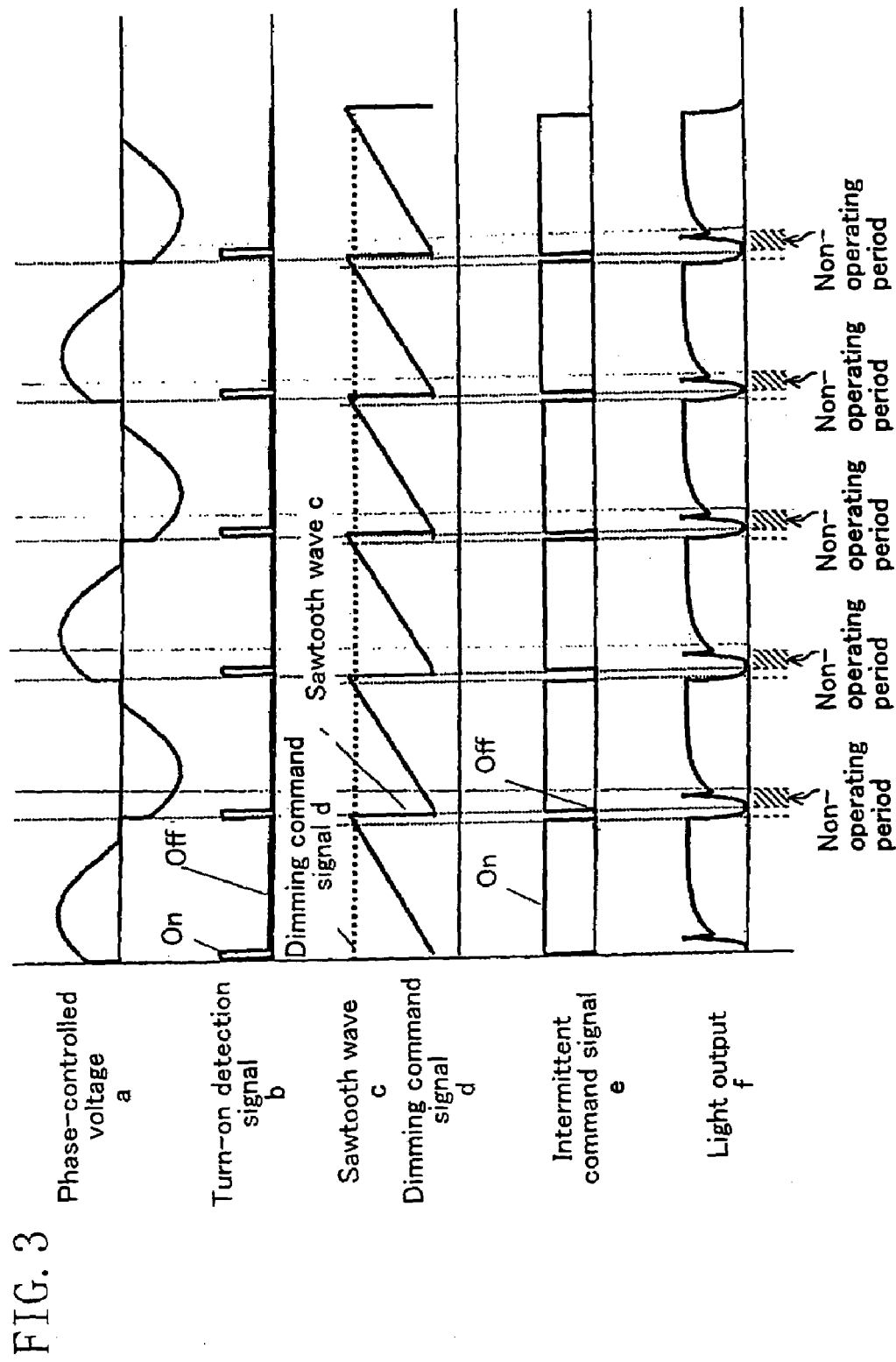
FIG. 3 illustrates waveform charts showing various waveforms in an intermittent dimmable operating state.

Hereinafter, the operation of the dimming controller 7 will be described in detail with reference to also FIG. 3. FIG. 3 shows the relationships among a phase-controlled voltage a, a turn-on detection signal b, a sawtooth wave c, a dimming command signal d, an intermittent command signal e, and a light output f, wherein in the five charts, each horizontal axis is a time axis, and the time axis serves as a common measure in the respective charts.

The phase-controlled voltage a in FIG. 3 is first inputted to the dimming control signal input section A 18 in the dimming controller 7 shown in FIG. 1. Then, the phase-controlled voltage a is full-wave rectified in the dimming control signal input section A 18, and is subsequently reduced to a voltage (e.g., 2V) appropriate for the driving of the photo coupler 19 and applied to the photo coupler 19.

Concurrently with the turn-on of the voltage phase-controlled in the dimmer 2, there occurs the turn-on of the full-wave rectified voltage inputted to the photo coupler 19. Next, after the rise time of the photo coupler 19 (e.g., 20 μs), a light emitting diode incorporated into the photo coupler 19 emits light.

Due to the light emission of the diode, a pulse wave synchronized with the turn-on and turn-off of the phase-controlled voltage a is outputted from a transistor that forms a part of the photo coupler 19. Then, due to the existence of an IC such as a monostable multivibrator, the sawtooth wave generator 20 outputs the turn-on detection signal b synchronized only with the turn-on of the phase-controlled voltage a by using, as a trigger input, the turn-on signal from the photo coupler 19.

The turn-on detection signal b is sent to a base terminal of the transistor, a capacitor connected between an emitter and a collector of the transistor is charged and discharged, and the sawtooth wave c is outputted.

On the other hand, the phase-controlled voltage a is inputted to the dimming control signal input section B 21 of the dimming controller 7 shown in FIG. 1, and is half-wave rectified by the dimming control signal input section B 21. Then, in the dimming command signal generator 22, the half-wave rectified portion of the phase-controlled voltage is integrated, and thereafter the dimming command signal d is outputted.

The comparator 23 receives, at its non-inverting input terminal and inverting input terminal, the sawtooth wave c and the dimming command signal d, respectively, and outputs the intermittent command signal e in accordance with the potential difference between both the signals.

Thereafter, the intermittent command signal e is transmitted to the switching circuit 9, and during the on period of the intermittent command signal e, the MOSFETs 11 and 12 of the DC-AC converter 6 are driven with the driving frequency f1 (Hz), thereby obtaining the light output f.

The on state of the intermittent command signal e is maintained until the potential of the sawtooth wave c becomes higher than that of the dimming command signal d. Upon inversion of the potential relationship, the intermittent command signal e becomes off, which is transmitted to the switching circuit 9, and the driving of the MOSFETs 11 and 12 is stopped, thus extinguishing light.

In this manner, the duty of the intermittent command signal e is determined by the potential relationship between the potential of the sawtooth wave c and that of the dimming command signal d, and furthermore, the operation during the on period of the intermittent command signal e and the extinguishing during the off period of the intermittent command signal e are repeated, thus enabling intermittent dimming.

In addition, the sawtooth wave generator 20 is set such that a certain potential is secured even if electrical charges of the capacitor for charge and discharge are completely discharged. For example, if three diodes, each having a forward voltage of about 0.6V, are connected to the emitter terminal, the minimum potential of the sawtooth wave c becomes about 1.8V. Besides, since the charge and discharge are carried out using, as a trigger, the signal of the turn-on of the phase-controlled voltage, the sawtooth wave maintains a constant waveform even if the conduction angle of the phase-controlled voltage is changed. On the other hand, since the half-wave rectified portion of the phase-controlled voltage is integrated, the potential of the dimming command signal d is changed, and if the potential of the dimming command signal d becomes equal to or lower than a certain potential (minimum potential) of the sawtooth wave c, all the intermittent command signals e enter the off period. And at or below a certain conduction angle of the phase-controlled voltage (i.e., at or below a conduction angle at which the minimum potential of the sawtooth wave c and the potential of the dimming command signal d become equal to each other), the driving of the MOSFETs 11 and 12 of the DC-AC converter 6 is stopped and thus the light is extinguished.

Thus, by adjusting the minimum potential of the sawtooth wave c, the driving of the MOSFETs 11 and 12 of the DC-AC converter 6 can be stopped and the light can be extinguished at an arbitrary phase level of the phase-controlled voltage from the dimmer.

Figure 4:
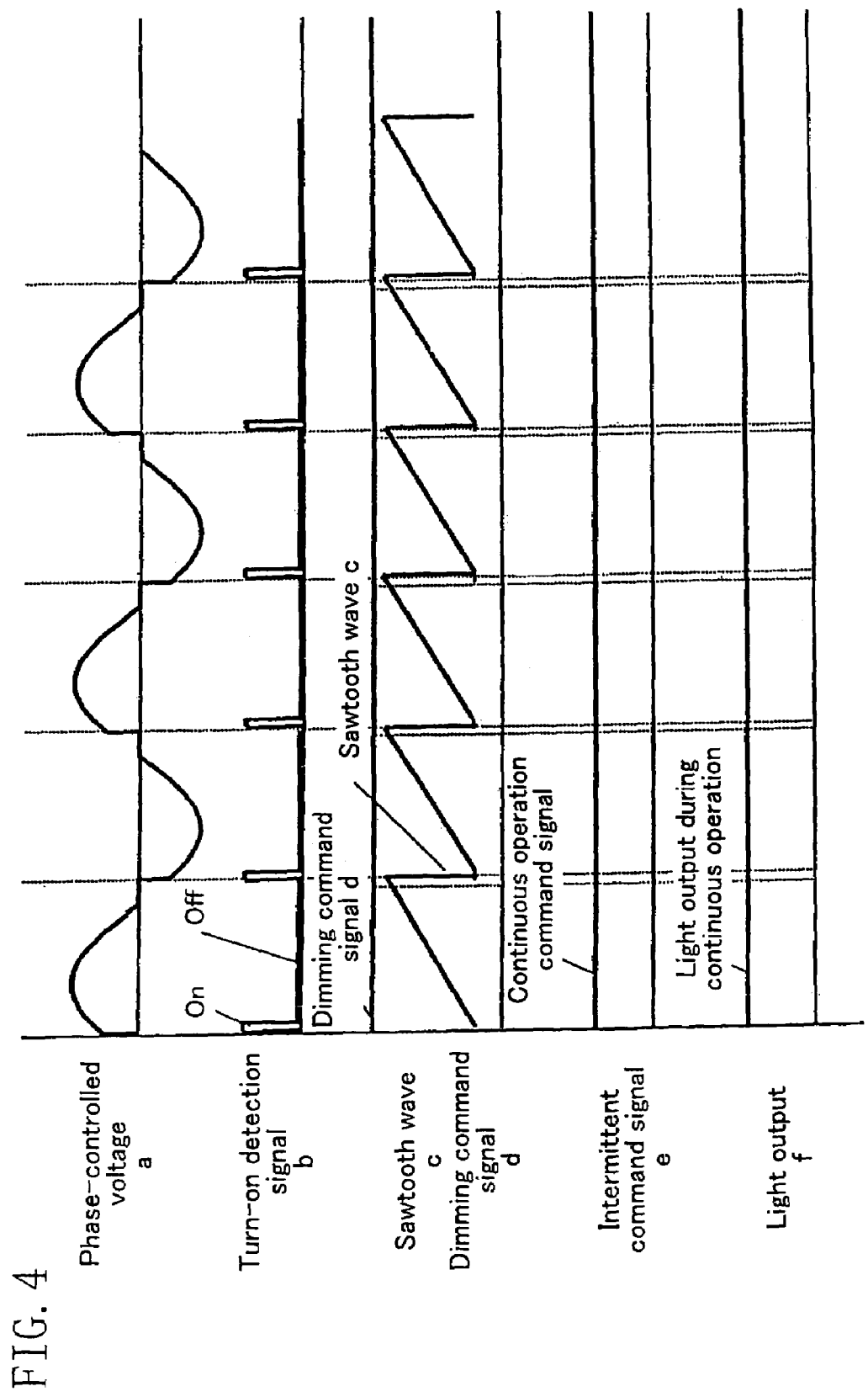
FIG. 4 illustrates waveform charts showing various waveforms in a continuous operating state.

Hereinafter, with reference to also FIG. 4, description will be made about the mechanism of the occurrence of discontinuous luminous flux change during dimming (darkening from a full illumination mode). FIG. 4 illustrates, in the configuration in which the dimming controller 7 is provided with no voltage limiter 25, various waveforms during full illumination in the continuous operating state.

As already shown in FIG. 3, in the intermittent dimmable operating state, a non-operating period (light extinction period) exists. On the other hand, as shown in FIG. 4, in the continuous operating state, the non-operating period (light extinction period) does not exist.

Supposing that dimming (darkening) is carried out from the state shown in FIG. 4 to the state shown in FIG. 3, there occurs a transition from the state where the non-operating period does not exist to the state where the non-operating period exists, and therefore, discontinuous luminous flux change occurs. That is, since the non-operating period abruptly begins upon transition from continuous operation driving to intermittent driving, the brightness is pronouncedly changed. Such a discontinuous luminous flux change (unevenness of dimming) observed when darkening is carried out from full illumination does not occur in a dimmable incandescent lamp, and thus makes a user feel uncomfortable.

Figure 5:
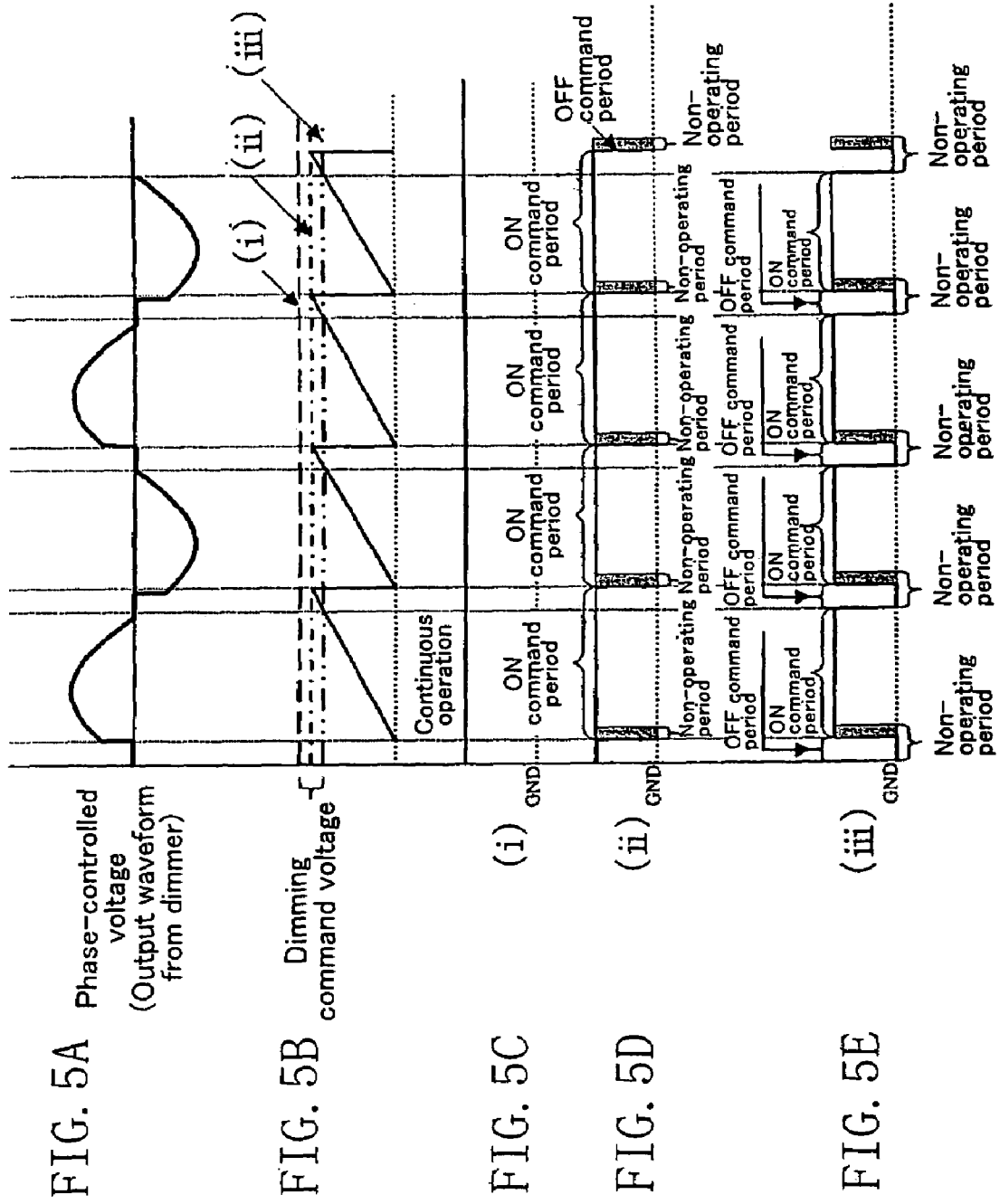
FIG. 5 illustrates waveform charts for describing the occurrence of discontinuous luminous flux change during darkening from a full illumination mode.

This discontinuous luminous flux change will be further described with reference to FIG. 5. FIG. 5 includes the states shown in FIG. 3 and FIG. 4 in the same diagram so as to provide an easy-to-understand description. FIG. 5(a) shows a phase-controlled voltage (output waveform from the dimmer), FIG. 5(b) shows three kinds of dimming command voltages (i), (ii) and (iii), and a sawtooth wave. Further, FIGS. 5(c), (d) and (e) show the intermittent command signals (ON command periods, OFF command periods) and the non-operating periods, corresponding to the dimming command voltages (i), (ii) and (iii).

First, like the dimming command voltage (i), if the dimming command voltage (dimming command signal) exceeds the maximum value of the voltage variation range of the triangular wave, the continuous operating state is reached, and thus the intermittent dimmable operating state is not reached as shown in FIG. 5(c).

Next, like the dimming command voltage (ii), if the dimming command voltage becomes equal to the maximum value of the voltage variation range of the triangular wave, a signal of the OFF command period is outputted during the ON command period, and the intermittent dimmable operating state is reached as shown in FIG. 5(d). As shown in FIG. 5(d), even if the OFF command period is short, the lamp enters the non-operating period (i.e., the non-operating period due to the start of operation) during the rise time thereof.

Further, like the dimming command voltage (iii), if the dimming command voltage is reduced, not only the OFF command period is extended but also the non-operating period is prolonged as shown in FIG. 5(e), resulting in a reduction in luminous flux.

Now, if a transition is made from the state shown in FIG. 5(c) to that shown in FIG. 5(d), the lamp, which has been in the continuous operating state thus far, momentarily enters the non-operating period, and therefore, the luminous flux change becomes discontinuous. As already mentioned above, this discontinuous luminous flux change is not preferable because it makes a user feel uncomfortable. On the other hand, if a transition is made from the state shown in FIG. 5(d) to that shown in FIG. 5(e), the luminous flux change is continuous because this transition takes place between both the states where the non-operating periods exist; hence, it is possible to eliminate the above-described problem that a user feels uncomfortable.

In short, the electrodeless discharge lamp operating device of the present embodiment is formed so as to prevent the dimming command signal from exceeding the limiter value set lower than the maximum value of the voltage variation range of the sawtooth wave; therefore, it is possible to always carry out intermittent driving such that the OFF command period (extinguishing period) exists, and as a result, a discontinuous time period is prevented from occurring in luminous flux change. In other words, the dimming controller 7 of the present embodiment outputs a signal for placing the electrodeless discharge lamp 3 into the intermittent dimmable operating state (e.g., the dimming command voltage (ii) or (iii) shown in FIG. 5(b)) even if dimming state is in full illumination, and does not output a signal for placing the electrodeless discharge lamp 3 into the continuous operating state (e.g., the dimming command voltage (i) shown in FIG. 5(b)) even if dimming state reaches full illumination.

In the configuration shown in FIG. 1, the voltage limiter 25 is provided so that the continuous operating state is not reached; however, other configuration may be adopted as long as the intermittent dimmable operating state can be maintained even if dimming is in full illumination state.

For example, the dimming controller 7 may be formed such that the angle and time of the sawtooth wave are set by a predetermined circuit, and the dimming command signal is prevented from exceeding the limiter value set lower than the maximum value of the voltage variation range of the sawtooth wave. Besides, the configuration of the dimmer 2 may be modified so that the intermittent dimmable operating state is maintained even if the dial or volume of the dimmer 2 is turned to maximum. In that case, typically, in consideration of characteristic variations in the dimmer or variations in the sawtooth wave, it is sufficient that the position of 95% output or 90% output, for example, corresponds to the maximum of the dial or volume of the dimmer 2.

As described above, in the electrodeless discharge lamp operating device (electrodeless self-ballasted fluorescent lamp) of the first embodiment, the dimming controller 7 outputs a signal for maintaining the intermittent dimmable operating state even if dimming is in full illumination state, and therefore, discontinuous luminous flux change can be prevented from occurring. As a consequence, a user does not feel uncomfortable. Furthermore, replacement with an incandescent lamp is enabled, and in addition, the electrodeless self-ballasted fluorescent lamp provided with dimming function can be further popularized.

It should be noted that in the present embodiment, the configuration of the electrodeless self-ballasted fluorescent lamp has been described; however, the present embodiment may also be applied to an electrodeless self-ballasted discharge lamp having no fluorescent material. In other words, the present embodiment may be applied to a discharge lamp such as a lamp for sterilization in which no fluorescent material is applied to its discharge bulb. Furthermore, the application is not limited to general illumination but may include, for example, the operation of a lamp for emitting rays of light for a person's health, which has an action spectrum effective against erythema or effective in generating vitamin D, or a lamp for growing plants, which has an action spectrum effective in enabling photosynthesis or morphogenesis of plants. In addition, as can be understood from the circuit diagram shown in FIG. 1, the configuration of the present embodiment is not limited to a self-ballasted lamp operating device, but may be applied to a discharge lamp operating device (i.e., an electrodeless discharge lamp operating device) in which the electrodeless fluorescent lamp 3 and the ballast circuit 4 are independently provided.

Hereinafter, a brief description will be made about the frequency of the high-frequency voltage applied from the ballast circuit 4 to the electrodeless fluorescent lamp 3 in the electrodeless self-ballasted fluorescent lamp of the present embodiment. The frequency in the present embodiment is in a relatively low frequency range of 1 MHz or less (e.g., 50 kHz to 500 kHz) as compared with an ISM frequency band of 13.56 MHz or several MHz which is practically and generally utilized. The frequency in such a low frequency range is used because of the following reasons. First, if the lamp is operated in a relatively high frequency range such as 13.56 MHz or several MHz, a noise filter for suppressing line noise generated from a high-frequency power supply circuit within the ballast circuit (circuit board) is increased in size, which undesirably increases the volume of the high-frequency power supply circuit. Further, supposing that noise radiated or propagated from the lamp is high-frequency noise, since laws and regulations are very strictly restricting the high-frequency noise, an expensive shield has to be provided and utilized in order to meet the restrictions, which presents a serious obstacle in achieving cost reduction. To the contrary, if the lamp is operated in a frequency range of about 1 MHz to 50 kHz, inexpensive general-purpose products, which are used as electronic components for general electronic equipment, can be utilized as components for forming the high-frequency power supply circuit; in addition, since the use of small-sized components is enabled, not only cost reduction but also size reduction can be achieved, thus obtaining considerable advantages. It is to be noted that the electrodeless fluorescent lamp 3 of the present embodiment does not have to be operated at a frequency of 1 MHz or less, but may alternatively be operated in a frequency range of 13.56 MHz or several MHz, for example.

(Embodiment 2)

Hereinafter, a second embodiment of the present invention will be described with reference to FIG. 6. Although the configuration of a discharge lamp operating device of the present embodiment is similar to that described in the first embodiment, a sawtooth wave generator 20 for detecting the turn-on of a phase-controlled voltage is formed differently from the counterpart in the first embodiment, and can be formed inexpensively without using any IC in the configuration of the present embodiment.

Figure 6:
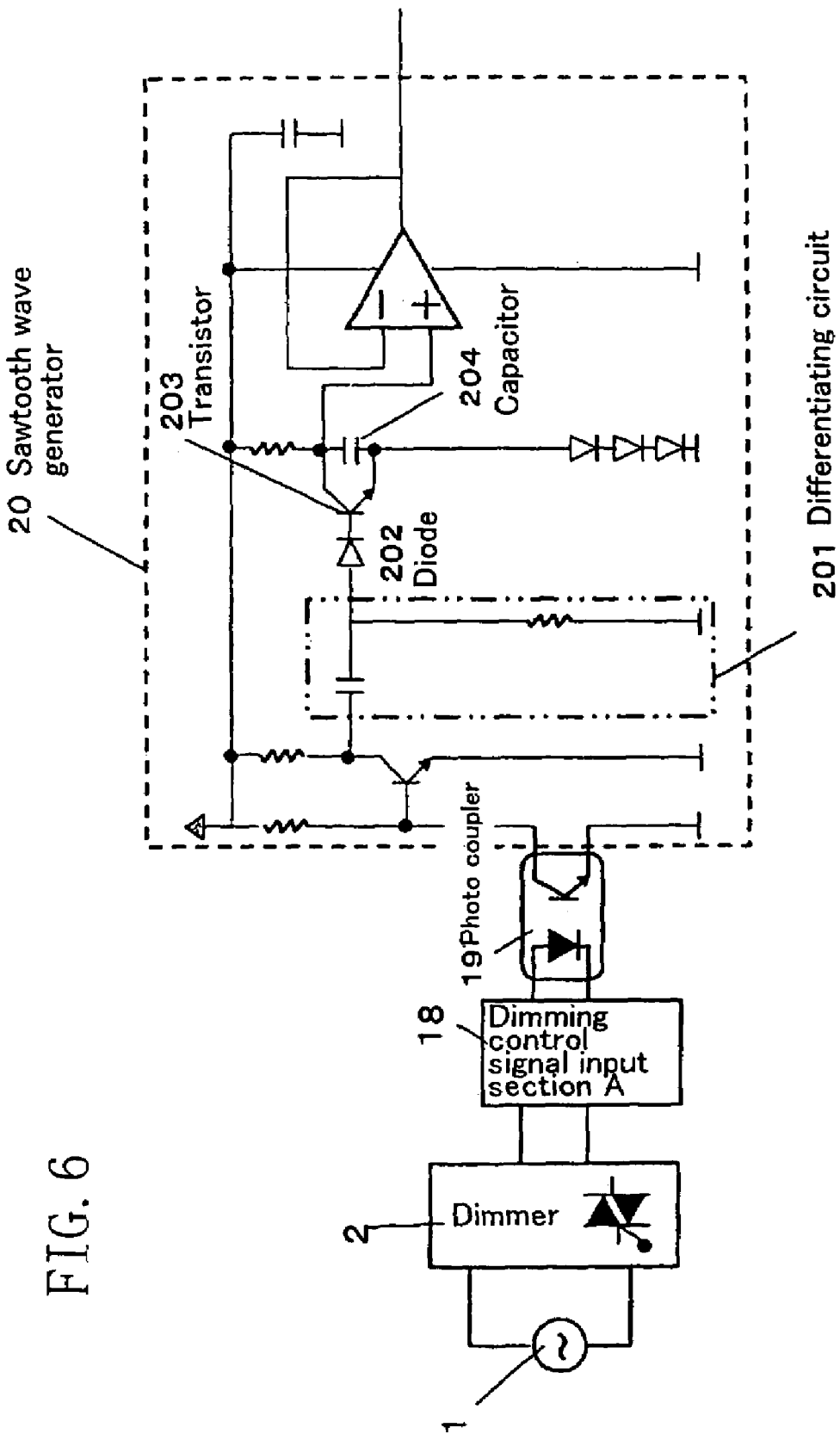
FIG. 6 is a diagram showing the circuit configuration of a discharge lamp operating device according to a second embodiment of the present invention.

FIG. 6 shows a circuit for detecting the turn-on of a phase-controlled voltage in the present embodiment, and in particular shows the configuration of the sawtooth wave generator 20. It should be noted that the same constituting elements as the counterparts described in the first embodiment are identified by the same reference characters, and the further description thereof will be omitted.

The sawtooth wave generator 20 shown in FIG. 6 has: a differentiating circuit 201; a diode 202; a transistor 203; and a capacitor 204, and the differentiating circuit 201 includes a capacitor and a resistor. The sawtooth wave generator 20 is connected to a dimming control signal input section A 18 via a photo coupler 19, the dimming control signal input section A 18 is connected to a dimmer 2, and the dimmer 2 is electrically connected to a commercial power supply 1.

In the present embodiment, the differentiating circuit 201 is connected to a collector terminal of the transistor of the photo coupler 19, which generates a pulse wave synchronized with the turn-on and turn-off of a phase-controlled AC voltage. An output terminal of the differentiating circuit 201 is connected with an anode of the diode 202, while a cathode of the diode 202 is connected with a base terminal of the transistor 203 for discharge. Between a collector terminal and an emitter terminal of the transistor 203 for discharge, the capacitor 204 for charge and discharge is connected. Due to such a configuration, the sawtooth wave generator 20 can generate a sawtooth wave synchronized with the turn-on of the phase-controlled voltage.

Hereinafter, operations to be performed in the present embodiment will be briefly described. Note that in the configuration of the present embodiment, the operation of the discharge lamp is based on the same principle as the first embodiment, and the further description thereof will be omitted.

Due to the pulse wave from the photo coupler 19, an output signal of the differentiating circuit 201 becomes a differential wave synchronized with a rising edge and a falling edge of the pulse wave, and only the differential wave synchronized with the rising edge by using the diode 202 with a low leakage current is inputted to the base terminal of the transistor 203. And the capacitor 204 connected between the collector terminal and emitter terminal of the transistor repeats charge and discharge using, as a trigger, the rising edge of the pulse wave from the photo coupler 19, thus allowing the generation of a sawtooth wave.

If the configuration of the second embodiment is adopted, it becomes possible to implement the sawtooth wave generator 20 with inexpensive components without using any expensive IC components. It should be noted that; more favorably, a buffer circuit is added, thus increasing output impedance.

(Embodiment 3)

Figure 7:
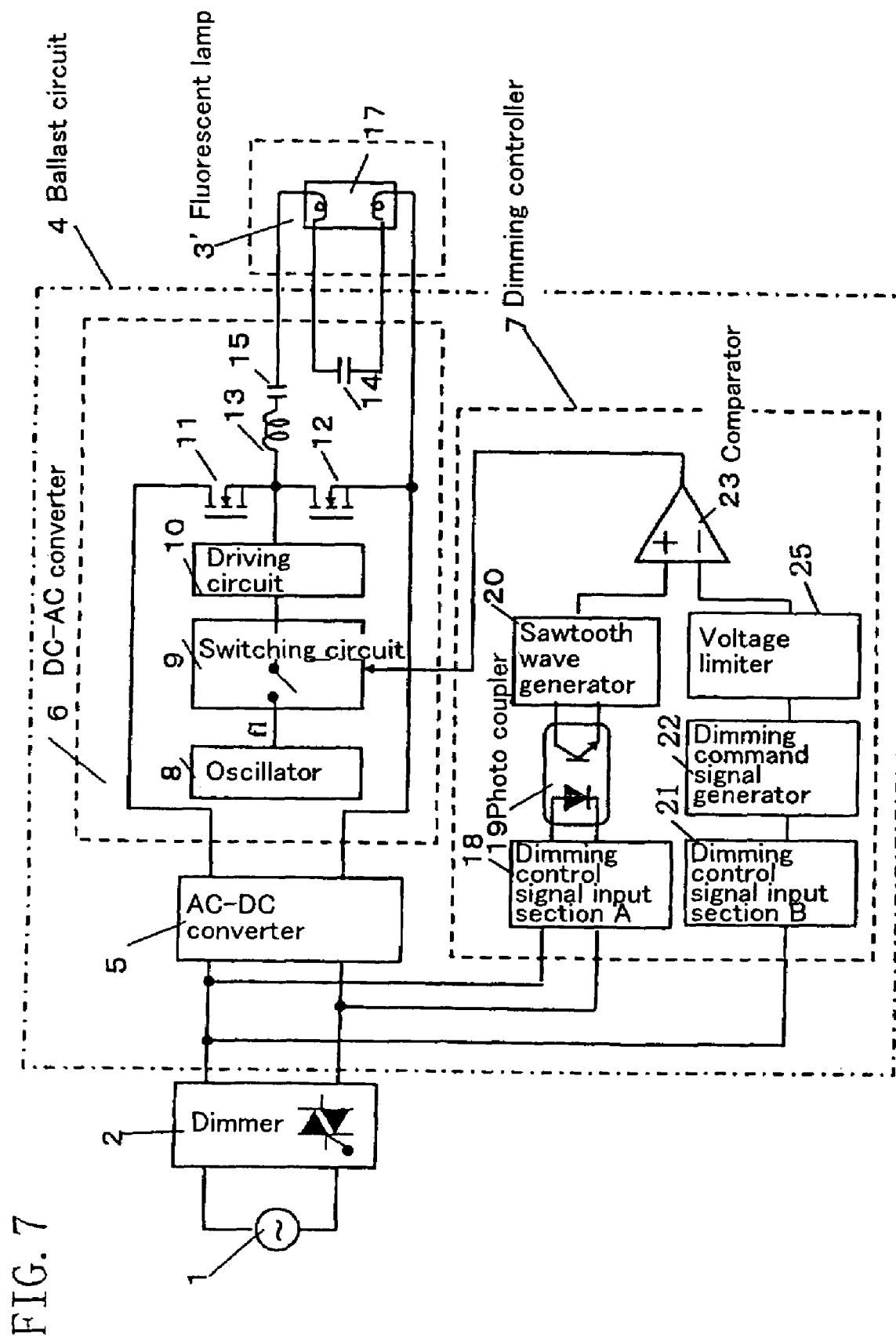
FIG. 7 is a diagram showing the circuit configuration of a discharge lamp operating device according to a third embodiment of the present invention.

FIG. 7 is a circuit diagram of a discharge lamp operating device according to a third embodiment of the present invention. The third embodiment differs from the above-described first embodiment in that a discharge bulb 17' has electrodes, and that a load resonant circuit is differently formed for the operation of a fluorescent lamp 3' having electrodes. It should be noted that the same constituting elements as the counterparts described in the first embodiment are identified by the same reference characters, and the further description thereof will be omitted.

In the configuration of the present embodiment, as shown in FIG. 7, an LC resonant circuit including: a fluorescent lamp 3'; a resonant inductor 13; a resonant capacitor 15; and a capacitor 14 for resonance and preheat is connected between a drain terminal and a source terminal of a MOSFET 12.

In the configuration of the present embodiment, if a high voltage is generated as a resonance voltage at both ends of the capacitor 14 of the LC resonant circuit, the temperature of each electrode is increased due to a preheat current flowing to the two electrodes within the discharge bulb 17', and if the generation of thermion from the electrodes is easily allowed, the discharge bulb 17' causes a breakdown and starts discharge. Once the discharge bulb 17' has started the discharge, the current flowing through the discharge bulb 17' is limited by the resonant inductor 15, thus maintaining the stable discharge.

The configuration and operation of a dimming controller 7 of the present embodiment are similar to those of the dimming controller 7 of the first embodiment. By implementing the configuration of the discharge lamp operating device as shown in FIG. 7, it becomes possible to stably carry out dimmable operation of the dimmable fluorescent lamp having electrodes.

Although the discharge lamp operating device of the present embodiment includes the fluorescent lamp 3' having electrodes, the ballast circuit 4 for carrying out intermittent driving is more suitable for use in combination with the electrodeless fluorescent lamp 3 of the first embodiment than for use in combination with the fluorescent lamp 3' having electrodes according to the present embodiment. This is because since the intermittent driving is an operation that repeats turning-on and turning-off, the electrodes of the fluorescent lamp 3' are severely worn out, thus causing the problem that their lives are shortened. In the present invention, since the electrodeless discharge lamp 3 has no electrode to begin with, such a problem will not occur.

It should be noted that in the first embodiment, the dimming controller 7 is formed so as to output a signal for synchronizing the timing of the turn-on of the phase-controlled voltage with that of the operation of the lamp intermittently driven by the DC-AC converter 6 because dimming operation can be carried out more favorably if the synchronization is achieved.

Figure 8:
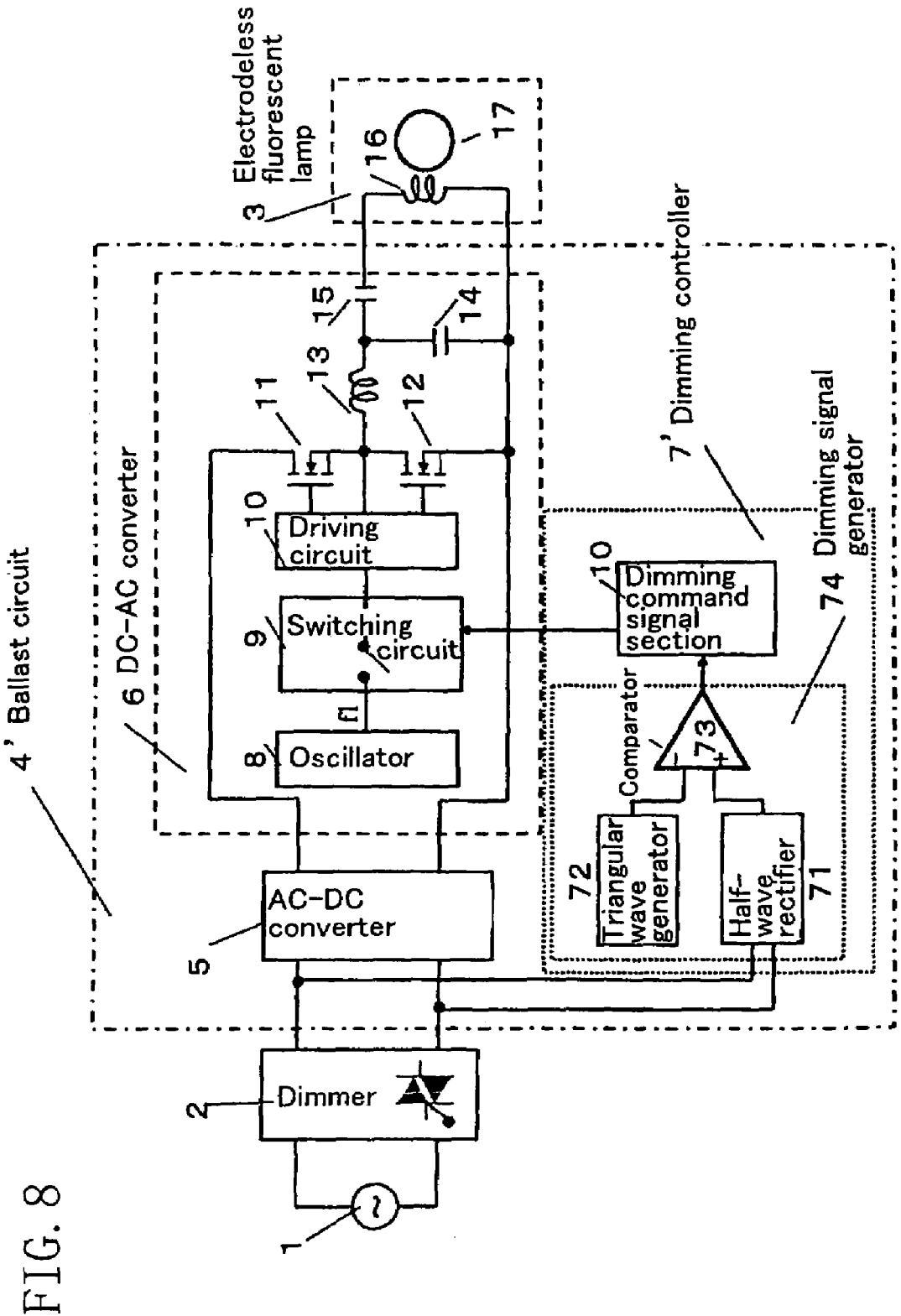
FIG. 8 is a diagram showing the circuit configuration of an asynchronous type discharge lamp operating device.

In the configuration shown in FIG. 8, a ballast circuit 4' carries out intermittent driving, but is not intended to synchronize the timing of the turn-on of the phase-controlled voltage with that of the operation of the lamp intermittently driven by a DC-AC converter 6. The configuration shown in FIG. 7 differs from that of the first embodiment in that a dimming controller 7' is formed so as to generate a dimming control signal and send a dimming command signal to the DC-AC converter (inverter circuit) 6.

The dimming controller 7' is made up of: a dimming signal generator 74; and a dimming command signal section 10 for sending the dimming command signal to the DC-AC converter 6. An output from a dimmer 2, phase-controlled by a triac, is half-wave rectified through a half-wave rectifier 71, a comparator 73 compares the resulting output voltage (120 Hz) with an output voltage from a triangular wave generator 72 for generating a reference voltage with a reference frequency (120 Hz), and then the comparator 73 outputs a pulse shape dimming signal with a constant frequency. The dimming signal is sent to the DC-AC converter 6 via the dimming command signal section 10, and the dimming of the electrodeless fluorescent lamp 3 is carried out while the on time and off time of the DC-AC converter 6 being changed. The electrodeless fluorescent lamp 3 is used as a discharge lamp, the switching frequency f1 of the inverter circuit is 200 kHz, and MOSFETs are used as switching elements.

Figure 9:
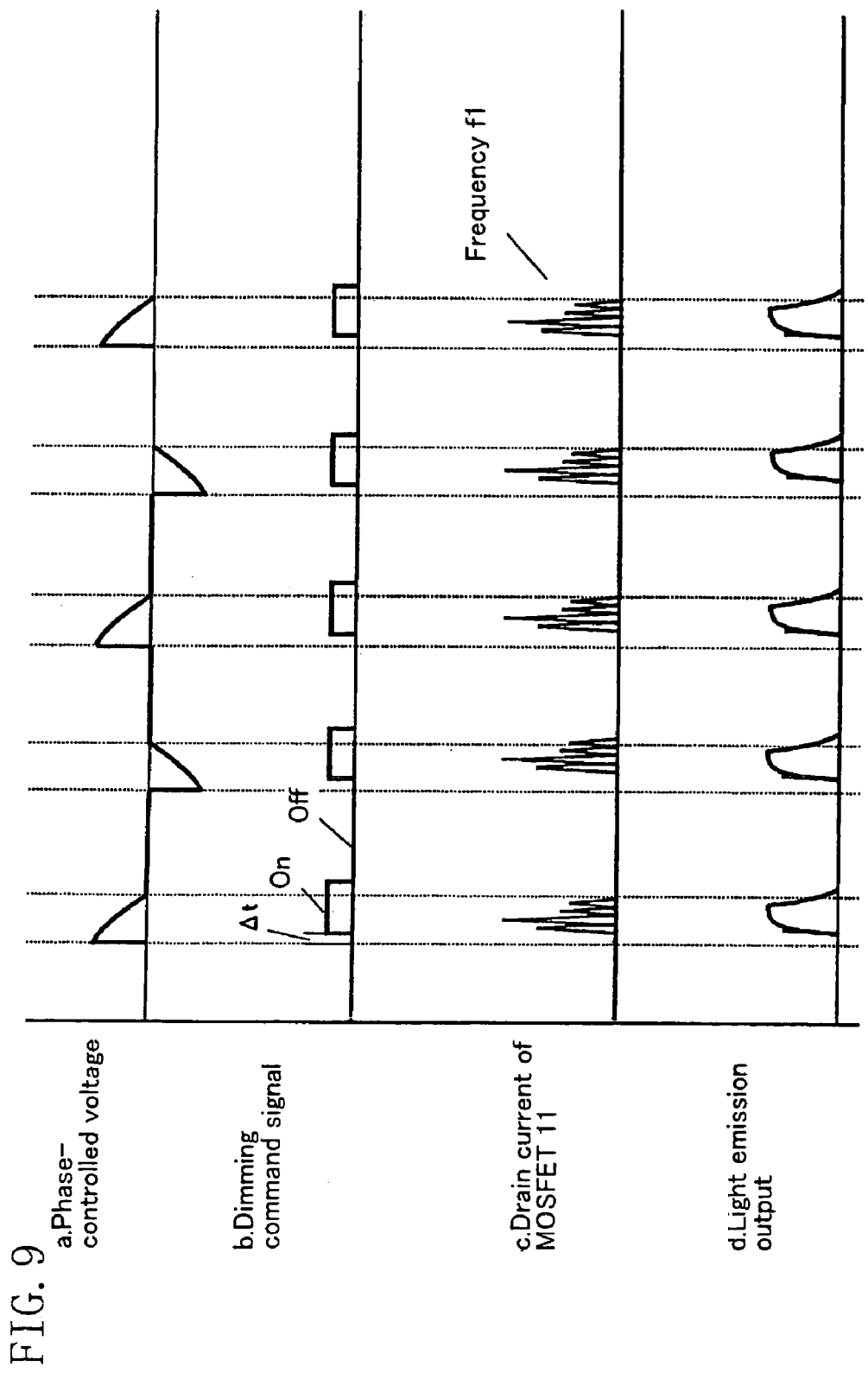
FIG. 9 illustrates various waveform charts concerning the discharge lamp operating device shown in FIG. 8.

FIG. 9 shows experimental results obtained from the configuration shown in FIG. 8. Hereinafter, in addition to the contents shown in FIG. 9, the operation and characteristic of the discharge lamp operating device shown in FIG. 8 will be described.

FIG. 9 illustrates waveform charts showing waveforms a through d, in which each horizontal axis is a time axis, and the time axis serves as a common measure in the respective waveform charts.

In FIG. 9, a represents the waveform of the voltage phase-controlled in the dimmer 2. As can be seen from this chart, the conduction angle of the triac of the dimmer 2 is close to $\pi$, and therefore, considerably deep dimming is carried out. In FIG. 9, b represents the dimming command signal that is sent from the dimming controller 7' to the DC-AC converter 6 when the phase-controlled voltage such as one having the waveform a in FIG. 9 is inputted to the ballast circuit 4'.

As can be understood from the comparison made between the waveforms a and b in FIG. 9, the turn-on of the phase-controlled voltage is not synchronized with the turn-on of the dimming command signal. That is, after the turn-on of the phase-controlled voltage, the sending of the dimming command signal from the dimming controller 7' to the DC-AC converter 6 is delayed by a time period $\Delta t$. Since a large amount of energy is required for the start of operation of the electrodeless fluorescent lamp 3, a large drain current flows through each of the MOSFETs 11 and 12 at the moment of operation of the lamp as indicated by the waveform c in FIG. 9. If the turn-on of the dimming command signal is delayed from that of the phase-controlled voltage by the time period $\Delta t$, the rising of the drain current of each of the MOSFETs 11 and 12 is delayed. Thus, a period of time during which a high-frequency electric power is supplied to the electrodeless fluorescent lamp 3 and a period of time for light emission are reduced accordingly, and in addition, the driving of the DC-AC converter 6 is stopped in the state where the phase-controlled voltage right after the turn-on thereof is at a highest level; consequently, a reduction in the light emission output of the electrodeless discharge lamp 3 is significant.

Figure 10:
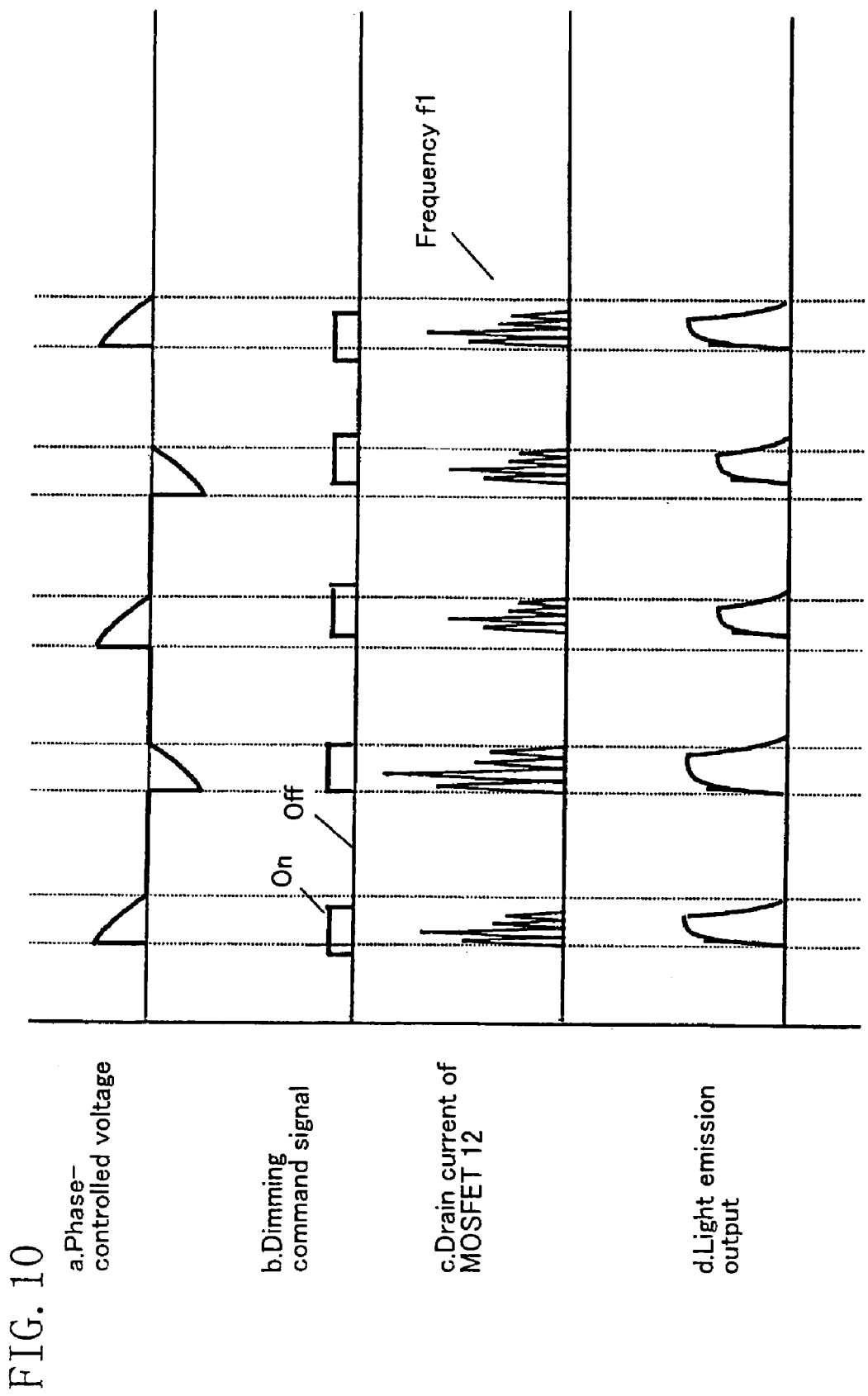
FIG. 10 illustrates various waveform charts concerning the discharge lamp operating device shown in FIG. 8.

If deeper dimming is carried out using the dimmer 2, the drain current of each of the MOSFETs 11 and 12 is decreased, and as a result, the high-frequency electric power supplied to the electrodeless fluorescent lamp 3 is reduced, and a threshold state where the lamp is operated or extinguished is nearly reached. In other example, there occurs a time lag as shown in FIG. 10. Also in this example, since the synchronization is not achieved, the high-frequency electric power supplied to the electrodeless fluorescent lamp 3 is similarly reduced, and the threshold state where the lamp is operated or extinguished is nearly reached. In such a state, flickering or undesirable extinguishing easily occurs, and furthermore, in carrying out deep dimming, the electrodeless fluorescent lamp 3 cannot be operated at all if the time lag Δt becomes too long.

The effects of the present invention are obtainable even if such an unstable state exists; however, in order to further extend dimmable range, it is preferable to achieve the synchronization and reduce the possibility of reaching the unstable state even if deeper dimming is carried out. This is because the range in which the actual brightness is variable (i.e., the range of the actual dimming) can be extended accordingly in that case, and as a result, a more outstanding dimmable electrodeless discharge lamp can be implemented.

According to the present invention, since the dimming controller outputs a signal for maintaining the intermittent dimmable operating state even if dimming state is in full illumination, it becomes possible to prevent discontinuous luminous flux change from occurring, and as a consequence, it becomes possible to make a user feel less uncomfortable.

INDUSTRIAL APPLICABILITY

In the present invention, it is possible to output a signal for maintaining an intermittent dimmable operating state even if dimming state is in full illumination so that the occurrence of discontinuous luminous flux change is prevented, and therefore, it is possible to provide an electrodeless discharge lamp that can be dimmed without causing uncomfortableness, resulting in an excellent industrial applicability.

What is claimed is:

1. An electrodeless discharge lamp operating device comprising:
   an electrodeless discharge lamp; and
   a ballast circuit for applying a high-frequency voltage to the electrodeless discharge lamp,
   wherein the ballast circuit comprises:
   an AC-DC converter for converting a phase-controlled AC voltage into a DC voltage;
   a DC-AC converter for converting the DC voltage into a high-frequency voltage, the DC-AC converter being formed so as to intermittently drive the electrodeless discharge lamp due to the existence of an operating period during which the high-frequency voltage is applied to the electrodeless discharge lamp so that the electrodeless discharge lamp is operated, and an extinguishing period during which the generation of the high-frequency voltage is stopped so that the electrodeless discharge lamp is extinguished; and
   a dimming controller for detecting the turn-on of the phase-controlled AC voltage, for outputting an intermittent command signal that changes the ratio between the operating period and the extinguishing period to the DC-AC converter, and for outputting a signal that maintains an intermittent dimmable operating state even if dimming is in full illumination state.

2. An electrodeless discharge lamp operating device comprising:
   an electrodeless discharge lamp; and
   a ballast circuit for applying a high-frequency voltage to the electrodeless discharge lamp,
   wherein the ballast circuit comprises:
   an AC-DC converter for converting a phase-controlled AC voltage into a DC voltage;
   a DC-AC converter for converting the DC voltage into a high-frequency voltage; and
   a dimming controller for outputting an intermittent driving signal to the DC-AC converter,
   wherein the dimming controller comprises:
   a circuit for generating a sawtooth wave or a triangular wave synchronized with the turn-on of the phase-controlled AC voltage; and
   a dimming command signal generator for generating a dimming command signal, and
   wherein the dimming controller is formed so as to prevent the dimming command signal from exceeding a limiter value set lower than the maximum value of the voltage variation range of the sawtooth wave or the triangular wave.

3. The electrodeless discharge lamp operating device of claim 2, wherein the dimming controller has a voltage limiter, which is connected to the dimming command signal generator, for preventing the dimming command signal from exceeding the limiter value.

4. The electrodeless discharge lamp operating device of claim 2, wherein the dimming controller is further formed so as to output a signal for synchronizing the timing of the turn-on with that of the operation of the lamp intermittently driven by the DC-AC converter.

5. An electrodeless discharge lamp operating device comprising:
   an electrodeless discharge lamp; and
   a ballast circuit for applying a high-frequency voltage to the electrodeless discharge lamp,
   wherein the ballast circuit comprises:
   an AC-DC converter for converting a phase-controlled AC voltage into a DC voltage;
   a DC-AC converter for converting the DC voltage into a high-frequency voltage and for intermittently driving the electrodeless discharge lamp; and
   a dimming controller for detecting the turn-on of the phase-controlled AC voltage and for outputting an intermittent command signal that changes the ratio between an operating period and an extinguishing period to the DC-AC converter, and
   wherein the dimming controller comprises:
   a circuit for generating a sawtooth wave or a triangular wave responsive to the turn-on phase of the waveform of the phase-controlled voltage;
   a dimming command signal generator for generating a dimming command signal responsive to the turn-on phase of the waveform of the phase-controlled voltage;
   a comparator for comparing the voltage of the sawtooth wave or the triangular wave with that of the dimming command signal and for outputting the intermittent command signal; and
   a voltage limiter provided between the comparator and the dimming command signal generator.

6. The electrodeless discharge lamp operating device of claim 5, wherein the dimming controller does not output a signal for placing the electrodeless discharge lamp into a continuous operating state even if dimming state reaches full illumination, and outputs a signal for placing the electrodeless discharge lamp into an intermittent dimmable operating state even if dimming state is in full illumination.

7. The electrodeless discharge lamp operating device of claim 1, wherein the dimming controller has a sawtooth wave generator comprising a differentiating circuit that comprises a capacitor and a resistor,
   wherein the differentiating circuit is connected to a collector terminal of a transistor for generating a pulse wave synchronized with the turn-on and turn-off of the phase-controlled AC voltage,
   wherein an output terminal of the differentiating circuit is connected with an anode of a diode, while a cathode of the diode is connected with a base terminal of a transistor for discharge, and wherein a capacitor for charge and discharge is connected between a collector terminal and an emitter terminal of the transistor for discharge, thus allowing the generation of a sawtooth wave synchronized with the turn-on of the phase-controlled AC voltage.

8. The electrodeless discharge lamp operating device of claim 1, wherein the phase-controlled AC voltage is an output voltage of a dimmer which has been phase-controlled by the dimmer.

9. An electrodeless self-ballasted fluorescent lamp comprising:

an electrodeless fluorescent lamp;

a ballast circuit for applying a high-frequency voltage to the electrodeless fluorescent lamp; and a lamp base electrically connected to the ballast circuit, wherein the electrodeless fluorescent lamp, the ballast circuit and the lamp base are formed as one unit, wherein the ballast circuit comprises:

an AC-DC converter for converting a phase-controlled AC voltage into a DC voltage;

a DC-AC converter for converting the DC voltage into a high-frequency voltage, the DC-AC converter being formed so as to intermittently drive the electrodeless fluorescent lamp due to the existence of an operating period during which the high-frequency voltage is applied to the electrodeless fluorescent lamp so that the electrodeless fluorescent lamp is operated, and an extinguishing period during which the generation of the high-frequency voltage is stopped so that the electrodeless fluorescent lamp is extinguished; and a dimming controller for detecting the turn-on of the phase-controlled AC voltage, for outputting an intermittent command signal that changes the ratio between the operating period and the extinguishing period to the DC-AC converter, and for outputting a signal that maintains an intermittent dimmable operating state even if dimming is in full illumination state.

10. A discharge lamp operating device comprising:

a discharge lamp;

an AC-DC converter for converting a phase-controlled AC voltage into a DC voltage;

a DC-AC converter for converting the DC voltage into a high-frequency voltage, the DC-AC converter intermittently driving the discharge lamp due to the existence of an operating period during which the high-frequency voltage is applied to the discharge lamp so that the discharge lamp is operated, and an extinguishing period during which the generation of the high-frequency voltage is stopped so that the discharge lamp is extinguished; and a dimming controller for detecting the turn-on of the phase-controlled AC voltage, for outputting an intermittent command signal that changes the ratio between the operating period and the extinguishing period to the DC-AC converter, and for outputting a signal that maintains an intermittent dimmable operating state even if dimming is in full illumination state.

11. The discharge lamp operating device of claim 10, wherein the dimming controller is further formed so as to output a signal for synchronizing the timing of the turn-on with that of the operation of the lamp intermittently driven by the DC-AC converter.

12. The discharge lamp operating device of claim 10, wherein the discharge lamp has a discharge bulb having a recessed portion, and wherein an induction coil is inserted into the recessed portion of the discharge bulb.

13. The electrodeless discharge lamp operating device of claim 2, wherein the phase-controlled AC voltage is an output voltage of a dimmer which has been phase-controlled by the dimmer.

14. The electrodeless discharge lamp operating device of claim 5, wherein the phase-controlled AC voltage is an output voltage of a dimmer which has been phase-controlled by the dimmer.

* * * * *